United States Patent

Kobayashi

[11] Patent Number: 5,270,934
[45] Date of Patent: Dec. 14, 1993

[54] CONSTANT-SPEED CRUISING CONTROL APPARATUS FOR VEHICLES

[75] Inventor: Kyoji Kobayashi, Yokohama, Japan

[73] Assignee: Jidosha Denki Kogyo Kabushiki Kaisha, Yokohama, Japan

[21] Appl. No.: 841,072

[22] Filed: Feb. 25, 1992

[30] Foreign Application Priority Data

Feb. 26, 1991 [JP] Japan .................. 3-030953

[51] Int. Cl.$^5$ .............................................. B60K 31/04
[52] U.S. Cl. .............................. 364/426.04; 364/424.1;
364/431.07; 123/352; 180/179
[58] Field of Search ........... 364/426.04, 424.1, 431.07;
123/352; 180/170, 177, 179

[56] References Cited

U.S. PATENT DOCUMENTS

| | | | |
|---|---|---|---|
| 4,845,621 | 7/1989 | Kawata et al. | 364/426.04 |
| 4,933,859 | 6/1990 | Tsuyama et al. | 364/426.04 |
| 4,938,604 | 7/1990 | Naitou et al. | 180/179 |
| 4,982,805 | 1/1991 | Naitou et al. | 364/426.04 |
| 5,010,490 | 4/1991 | Naitou et al. | 364/426.04 |
| 5,038,880 | 8/1991 | Matsuoka et al. | 364/426.04 |
| 5,148,721 | 9/1992 | Anan et al. | 364/424.1 |
| 5,154,250 | 10/1992 | Murai | 364/424.1 |

*Primary Examiner*—Gary Chin
*Attorney, Agent, or Firm*—Sughrue, Mion, Zinn, Macpeak & Seas

[57] ABSTRACT

A constant-speed cruising control apparatus for vehicles, which comprises a reed switch for generating a vehicle speed signal, a set switch for setting the cruising speed, a memory circuit for storing and outputting a cruising speed signal, a first comparing circuit for comparing the cruising speed signal with the vehicle speed signal, an actuator for actuating a throttle valve according to a signal output from the first comparing circuit, a first computing circuit for calculating expectation value of vehicle speed change on basis of the signal output from the first comparing circuit, a second computing circuit for calculating change of the vehicle speed signal, a second comparing circuit for comparing signals output from the first and the second computing circuits, and a down-shift circuit for shifting an automatic transmission into lower gear on basis of a signal output from the second comparing circuit.

4 Claims, 2 Drawing Sheets

100

CONSTANT-SPEED CRUISING CONTROL APPARATUS FOR VEHICLES

BACKGROUND OF THE INVENTION

1. Field of the Invention

This invention relates to a constant-speed cruising control apparatus for vehicles and, more particularly to an improved and novel constant-speed cruising control apparatus suitable for vehicles mounted with an automatic transmission or torque converters.

2. Description of the Prior Art

Heretofore, in a constant-speed cruising apparatus for the vehicles such as an automobile and the like which are mounted with the automatic transmissions or torque converters, the cruising speed is controlled constantly by actuating the throttle valve in the opening or closing direction using a diaphragm type actuator or a servomotor.

FIG. 2 is a block diagram showing a conventional constant-speed cruising control apparatus for vehicles.

In the illustrated constant-speed cruising control apparatus 100, numeral 10 is a read switch used to detect a running speed of the vehicle and numeral 12 is a permanent magnet to be rotated through a speed meter cable. The reed switch 10 is changed on and off by the rotation of the permanent magnet 12, and generates a pulse signal having a frequency proportional to the actual running speed of the vehicle. The pulse signal is converted at a frequency-voltage conversion circuit (hereinafter, referred to as F/V conversion circuit) 14 into a signal having a voltage proportional to the vehicle speed, that is a vehicle speed signal. The signal output from the F/V conversion circuit 14 is sent to a memory circuit 18 if an analog switch 16 is turned on, and the signal at the time just before switching-off the analog switch 16 is stored in the memory circuit 18 as a cruising speed signal corresponding to the cruising speed to be maintained constantly. The memory circuit 18 is constructed conventionally from a semiconductor memory, and the signal stored in the memory circuit 18 is compared in a comparing circuit 20 with the signal output from the F/V conversion circuit 14, that is the signal corresponding to the actual vehicle speed. The result of the comparison is sent to an actuator 28 through an AND gate 24 and a drive circuit 26, and a control valve 28a of the actuator 28 is driven.

In order to control the drive carried out by the actuator 28, the comparing circuit 20 generates a pulsed output signal of which duty ratio changes so as to decrease the time for applying an electric current to the control valve 28a in case the actual vehicle speed corresponding to the signal output from the F/V conversion circuit 14 is higher than the cruising speed corresponding to the signal stored in the memory circuit 18, and changes so as to increase the time for applying an electric current to it in a case contrary to this.

The AND gate 24 opens only when a signal output from a self-hold circuit 34 is logic "1", and transmits the signal output from the comparing circuit 20 into the drive circuit 26.

A set switch 38 to be operated for setting the cruising speed generates an output signal having logic "0" at the time of being operated by the driver, and generates an output signal having logic "1" when the operation is released. The signal output from the set switch 38 is impressed on the analog switch 16 and the self-hold circuit 34 through an inverter 40. Accordingly, the analog switch 16 is changed on if the set switch 38 is operated, and changed off when the operation is finished. The self-hold circuit 34 is also set when the set switch 38 is operated.

The self-hold circuit 34 consists of a flip-flop, for example, self-holds that the setting operation is carried out by the set switch 38, and transmits the output signal to the drive circuit 36 and works to open the AND gate 24 during the self-holding. The self-hold circuit 34 is reset when one of a stop lamp switch 44, a parking brake switch 46 and a neutral start switch 48 is changed on, and makes the drive circuit 36 off and works to close the AND gate 24. The stop lamp switch 44, the parking brake switch 46 and the neutral start switch 48 are structured as to be changed on when a brake pedal is depressed, a parking brake is operated and the automatic gear is shifted into the neutral position, respectively.

The actuator 28 is provided with the control valve 28a, a cancel valve 28b and so on. The control valve 28a is controlled so as to be opened or closed according to the signal output from the AND gate 24 through the drive circuit 26. Namely, when the self-hold circuit 34 is set and the drive circuit 26 is applied with an electric current, the control valve 28a isolates the external atmosphere to be introduced through a port 28c and introduces negative pressure of the intake manifold into a negative pressure chamber 28e through a port 28d, and the control valve 28a isolates the negative pressure through the port 28d and introduces the atmospheric pressure into the negative pressure chamber 28e through the port 28c if the electric current is shut off to the drive circuit 26. The ratio between the atmospheric pressure introduced through the port 28c and the negative pressure of the intake manifold introduced through the port 28d is controlled according to the duty ratio of the pulse signal output from the comparing circuit 20. The cancel valve 28b is controlled so as to be opened or closed according to the signal output from the self-hold circuit 34 through the drive circuit 36. Namely, when the self-hold circuit 34 is set and the drive circuit 36 is applied with an electric current, the cancel valve 28b isolates the external atmosphere through a port 28f, and if the self-hold circuit 34 is reset and the electric current is shut off to the drive circuit 36, the cancel valve 28b introduces the atomospheric pressure into the negative pressure chamber 28e. Therefore, a diaphragm 28g moves by controlling the pressure in the negative pressure chamber 28e, thereby driving a rod 28h connected with an accel linkage (not shown) in the axial direction and controlling the opening of the throttle valve, consequently the vehicle is maintained in the state of constant-speed cruising.

The vehicle mounted with the conventional constant-speed cruising control apparatus described above sometimes becomes incapable of maintaining the setting cruising speed in a case of running on a steep uphill road. Namely, the constant-speed cruising control apparatus having the actuator of the diaphragm type as shown in FIG. 2 has a weakpoint that it is impossible to run at the constant cruising speed because the apparatus becomes incapable of following the setting cruising speed when the vehicle travels on the steep uphill road. In other words, because load applied on the vehicle increases as the rising gradient of the road becomes steep, whereby the rotational frequency of the engine decreases and the negative pressure of the intake manifold becomes insufficient as natural results in the case of using the actuator of the diaphragm type, the actuator is not capable of opening the throttle valve sufficiently and it is not possible to control the vehicle so as to run at the constant cruising speed.

Also in case of using the servomotor for actuating the throttle valve, it is impossible to follow driving torque against the rising gradient of the road and the tractive force of the engine becomes insufficient in a case in which reduction ratio of the transmission of the vehicle is not so high even if the throttle valve can be opened sufficiently, there is a weakpoint in that the actual vehicle speed decreases as compared with the setting cruising speed.

A constant-speed cruising control apparatus is disclosed in U.S. Pat. No. 4,421,192, which controls the vehicle so as to maintain the constant-speed cruising by shifting the transmission down if the apparatus is unable to follow the setting cruising speed. Namely, the apparatus disclosed in the Japanese Patent Document is so designed as to restore the vehicle speed by shifting automatically the transmission to the third gear from the top gear, for example, when the actual vehicle speed decreases as compared with the setting cruising speed by the order of 7 km/h.

However, in the above-mentioned constant-speed cruising control apparatus which shifts the automatic transmission down automatically, the automatic transmission is not shifted down until the actual vehicle speed becomes lower than the setting cruising speed by 7 km/h even when the actual speed of the vehicle drops gradually on the uphill road, therefore there is a problem in that it is not possible to perform the constant-speed cruising control speedily.

SUMMARY OF THE INVENTION

It is an object of the invention to provide a constant-speed cruising control apparatus for vehicles which is excellent in responsibility and possible to maintain steadily the constant-speed cruising of the vehicle even when the vehicle travels on the uphill road, for example.

The construction of the constant-speed cruising control apparatus for vehicle mounted with an automatic transmission according to this invention in order to accomplish the above-mentioned object is characterized by comprising vehicle speed signal generating means for outputting a vehicle speed signal corresponding to a speed of a vehicle, cruising speed setting means for setting a vehicle speed for constant-speed cruising as a cruising speed, cruising speed signal memory means for storing a vehicle speed signal output from the vehicle speed signal generating means as a cruising speed signal when the cruising speed is set by the cruising speed setting means and outputting the cruising speed signal, first comparing means for comparing the cruising speed signal output from the cruising speed signal memory means with a vehicle speed signal output from the vehicle speed signal generating means and outputting a comparing signal in response to a result of the comparison, throttle control means for controlling a throttle valve in the opening or closing direction according to the comparing signal output from the first comparing means, first computing means for calculating expectation value of vehicle speed change on basis of the comparing signal output from the first comparing means, second computing means for calculating change of the vehicle speed signal output from the vehicle speed signal generating means, second comparing means for comparing a signal output from the first computing means with a signal output from the second computing means and generating a signal in a case where value of the signal output from the second computing means does not attain the value of the signal output from the first computing means, and down-shift means for shifting the automatic transmission into lower gear when the signal is output from the second comparing means.

In the constant-speed cruising control apparatus according to this invention, the first computing means calculates the expectation value, that is an estimate value of the change of the vehicle speed changeable by the throttle control means which is controlled according to the signal output from the first comparing means. The second computing means calculates the change of the vehicle speed changed actually by the throttle control means. Furthermore, the second comparing means compares the signal of the expectation value calculated by the first computing means with the signal of the change of the vehicle speed calculated by the second computing means and determines whether the actual change of the vehicle speed controlled by the throttle control means attains the expectation value of the vehicle speed change or not. Usually, if the vehicle travels on the uphill road, the load applied on the vehicle increases, the vehicle speed drops and the change of the vehicle speed is different from the expectation value. The second comparing means generates the output signal in a case where the change of the vehicle speed deviates from the expectation value. The down-shift means shifts the automatic transmission into the lower gear position according to the signal output from the second comparing means. By the down-shift of the automatic transmission, the acceleration of the vehicle is facilitated against the increase of the load applied on the vehicle, thereby enabling the vehicle to run at a constant cruising speed even when the vehicle travels on the uphill road.

DESCRIPTION OF THE PREFERRED EMBODIMENT

An embodiment of the constant-speed cruising control apparatus for vehicles according to this invention will be described below on the basis of the drawings.

Figure 1:
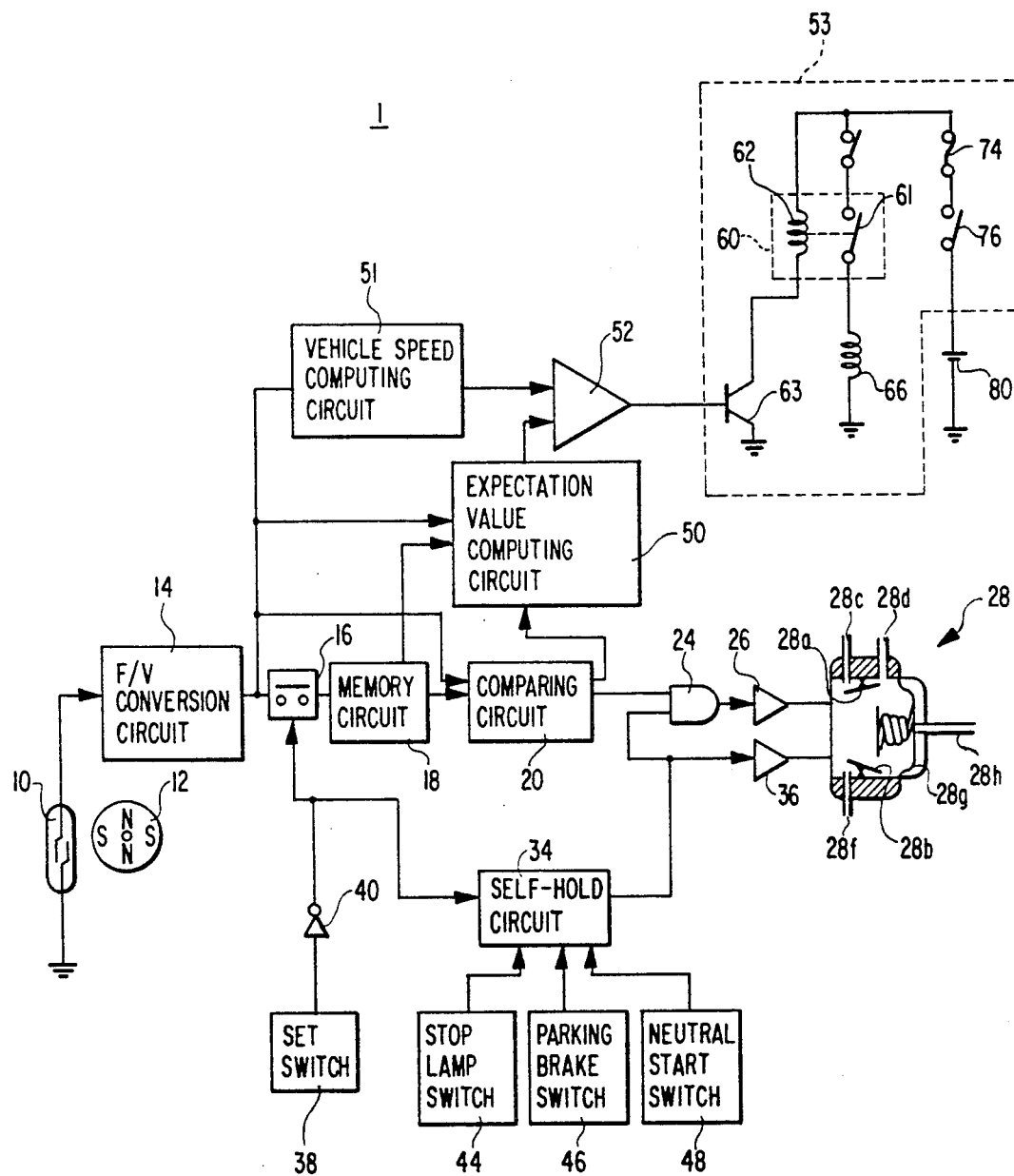
FIG. 1 is a block diagram showing an embodiment of the constant-speed cruising control apparatus for vehicles according to this invention.
Figure 2:
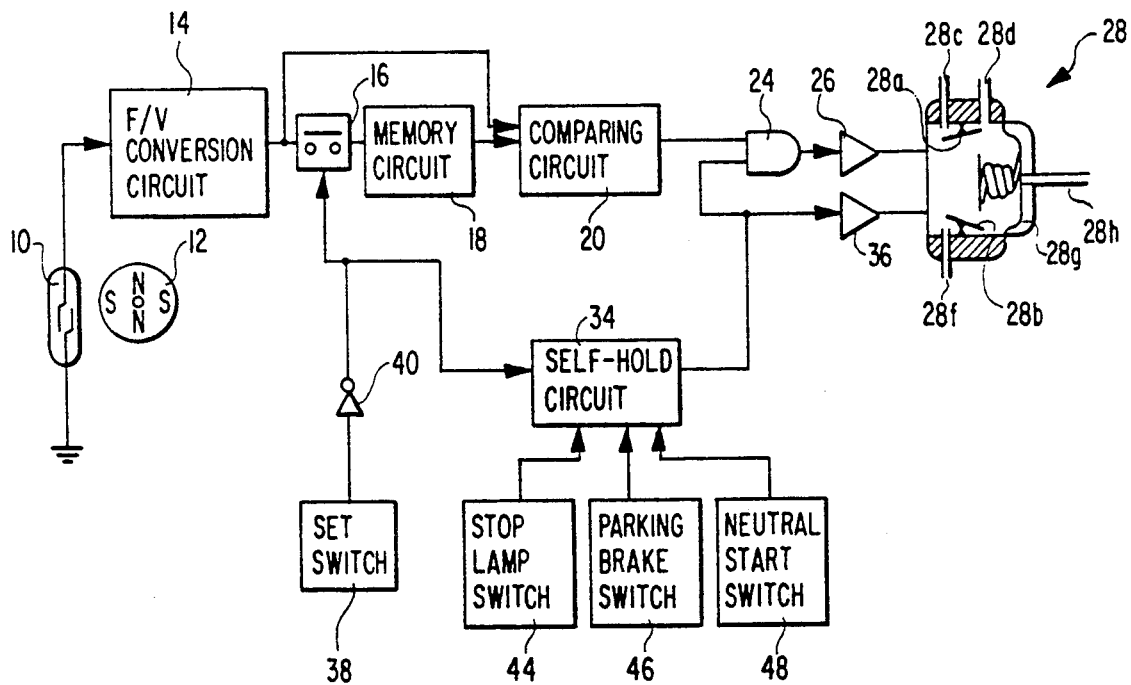
FIG. 2 is a block diagram of the conventional constant-speed cruising control apparatus.

FIG. 1 is a block diagram for explaining the embodiment of the constant-speed cruising control apparatus according to this invention by adding constructions required for the apparatus according to this invention to the conventional apparatus as shown in FIG. 2, therefore, devices designated by using the same reference number have similar structure and similar function.

In the constant-speed cruising control apparatus 1 shown in FIG. 1, an expectation value computing circuit 50 (first computing means) consist of an arithmetic circuit, and supplied with the comparing signal from the comparing circuit 20 (first comparing means), or supplied with the cruising speed signal stored in the memory circuit 18 (cruising speed signal memory means) from the memory circuit 18 and the vehicle speed signal proportional to the actual vehicle speed from the reed switch 10 (vehicle speed signal generating means) through the F/V conversion circuit 14. The expectation value computing circuit 50 calculates the expectation value for estimating the change of the vehicle speed possible to be changed by the actuator 28 and the drive circuit 26 (throttle control means) actuated according to the comparing signal output from the comparing circuit 20 on basis of the above-mentioned signals.

A vehicle speed change computing circuit 51 (second computing means) is provided with a shift resister and an arithmetic circuit, for example, and supplied with the vehicle speed signal proportional to the vehicle speed from the F/V conversion circuit 14. The vehicle speed computing circuit 51 stores the signal and calculates the change of the vehicle speed signal output from the F/V conversion circuit 14 and changing with time.

A comparing circuit 52 (second comparing means) is supplied with respective output signals from the expectation value computing circuit 50 and the vehicle speed change computing circuit 51 and compares the both output signals. In general, when the vehicle travels under comparable conditions, the signal of the expectation value output from the expectation value computing circuit 50 is substantially in agreement with the signal of the vehicle speed change output from the vehicle speed change calculating circuit 51, and the comparing circuit 52 does not generate an output signal. Difference arises between the respective signals output from the both circuits 50 and 51, and when the value of the signal of vehicle speed change decreases less than that of the signal of the expectation value, the comparing circuit 52 generates the output signal.

When the vehicle travels to the uphill road from the level road, for example, the load applied on the vehicle increases usually and the speed of the vehicle drops gradually. Hereupon, in the constant-speed cruising control apparatus 1, the comparing circuit 20 supplies the accelerative signal, that is the signal to actuate the throttle valve in the opening direction to the drive circuit 26 and the actuator 28. The signal output from the comparing circuit 20 is supplied also to the expectation value computing circuit 50, the expectation value computing circuit 50 calculates the expectation value of the change of the vehicle speed changeable according to the accelerative signal, for example. Usually, the expectation value calculated on basis of the accelerative signal is relatively large. The signal of the expectation value is supplied to the comparing circuit 52. The vehicle speed change computing circuit 51 calculates the signal of the vehicle speed change according to the vehicle speed signal before the accelerative signal is supplied to the drive circuit 26 from the comparing circuit 20 and the vehicle speed signal after the accelerative signal is supplied to the drive circuit 26, and supplies the signal of the vehicle speed change to the comparing circuit 52.

When the vehicle enters to the uphill road from the level road, the vehicle is not accelerated and the vehicle speed is not changed so remarkably in spite of the fact that the accelerative signal is supplied to the drive circuit 26 from the comparing circuit 20 since the load applied on the vehicle increases. Therefore, the value of the signal of the vehicle speed change calculated by the vehicle speed change computing circuit 51 is smaller than the value of the signal of the expectation value generally. Accordingly, the comparing circuit 52 generates the output signal when the vehicle starts the travel on the uphill road, and the signal output from the comparing circuit 52 is supplied to a down-shift circuit 53 (down-shift means).

The down-shift circuit 53 for the automatic transmission is composed of a relay 60 having a normally closed contact 61 and a relay coil 62, a transistor 63 for actuating the relay 60, a shift solenoid 66, a transmission control switch 70, a fuse 74 and an ignition switch 76 connected to a battery 80.

The normally closed contact 61 of the relay 60 connected with the shift solenoid 66 is connected to the transmission control switch 70. The coil 62 of the relay 60 and the transmission control switch 70 are connected to the battery 80 through the fuse 74 and the ignition switch 76.

The down-shift circuit 53 is so structured as to shift the automatic transmission into lower gear by changing the shift solenoid 66 from the excited state to the unexcited state. If the automatic transmission is designed so as to be shifted to the top gear by supplying an electric current to the shift solenoid 66, for example, the automatic transmission is shifted down to the third gear by cutting off the electric current to the shift solenoid 66.

The power supply to the shift solenoid 66 is controlled by the transistor 62. Namely, when the output signal from the comparing circuit 52 changes to high level signal and the transistor 63 changes to the on-state from the off-state, the relay 60 works, thereby opening the normally closed contact 61. Consequently, the shift solenoid 66 changes from the excited state to the unexcited state.

Explanation will be given below about the function of this embodiment of the constant-speed cruising control apparatus according to this invention at the case in which the vehicle enters the uphill road from the level road and the load applied on the engine of the vehicle is increased.

If the vehicle passes into the travelling on the uphill road and the vehicle speed engines to decrease less than the setting cruising speed during the constant-speed cruising at the state of shifting the automatic transmission to the top gear, the pulse signal output from the comparing circuit 20 changes to the pulse signal having a high duty ratio, namely the time period of high level "1" becomes longer. When the comparing circuit 20 generates the pulse signal having the large duty ratio according to the decrease of the vehicle speed, the actuator 28 actuates the throttle valve (not shown) in the opening direction so as to increase the vehicle speed. At the same time, the expectation value computing circuit 50 calculates the expectation value of the vehicle speed change for estimating the increase of the vehicle speed caused by the opening actuation of the throttle valve on basis of the comparing signal output from the comparing circuit 20. The expectation value computing circuit 50 may also calculate the expectation value on basis of the vehicle speed signal from the F/V conversion circuit 14 and the cruising speed signal from the memory circuit 18. The vehicle speed change computing circuit 51 stores the vehicle speed signals changing with time, calculates the change of the vehicle speed according to the stored signals and outputs the signal of the vehicle speed change. The signal of the expectation value generated from the expectation value computing circuit 50 and the signal of the vehicle speed change generated from the vehicle speed change computing circuit 50 are supplied equally to the comparing circuit 52. In the case the vehicle continues to travel on the uphill road, the speed of the vehicle does not increase as compared with the travelling on the level road in spite of the fact that the actuator 28 actuates the throttle valve in the opening direction. Accordingly, the value of the signal of the vehicle speed change becomes smaller as compared with that of the signal of the expectation value. Namely the value of the signal of the expectation value exceeds the value of the signal of the vehicle speed change. When the value of the signal output from the expectation value computing circuit 50 exceeds the value of the signal output from the vehicle speed change computing circuit 51, the signal output from the comparing circuit 52 changes to the high level signal, and so the transistor 63 is changed on. The comparing circuit 52 has hystersis characteristics, and is maintained in the on-state until the value of the signal output from the expectation value computing circuit 50 becomes smaller than the value of the signal of the vehicle speed change after being switched on once.

When the transistor 63 is switched on, the power supply to the shift solenoid 66 is shut off and the automatic transmission is shifted down from the top gear to the third gear. Consequently, the tractive force of the engine increases and the slowing down of the vehicle speed is conpensated, so that it is possible to maintain the vehicle in the state of constant-speed cruising.

When the vehicle starts the travelling on the level road after passing through the uphill road, the time period of the high level "1" of the pulse signal output from the comparing circuit 20 becomes shorter (the duty ratio of the pulse signal becomes lower). When the value of the signal output from the expectation value computing circuit 50 comes back to the value lower than the value of the signal output from the vehicle speed change computing circuit 51 by the predetermined value according to the action of the throttle valve in the closing direction caused by the actuator 28, the transistor 63 is switched off. Thus the automatic transmission is shifted up from the third gear to the top gear and the vehicle proceeds to the constant-speed cruising in this state.

In the above-mentioned embodiment, although the comparing circuit 52 is so structured as to generate the output signal in the case where the value of the signal output from the vehicle speed change computing circuit 51 does not attain the value of the signal output from the expectation value computing circuit 50, the comparing circuit 52 may be also so structured as to generate the output signal and supply it to the down-shift circuit 53 when the value of the signal output from the vehicle speed change computing circuit 51 exceeds the value of the signal output from the expectation value computing circuit 50 as much as the predetermined value. In this case, it is possible to maintain the vehicle in the state of the constant-speed cruising by shifting the automatic transmission to the lower side and using the engine brake when the vehicle speed increases more than the setting cruising speed during the travel on the downhill road.

Additionally, although the explanation has been given about the case where the automatic transmission is shifted down from the top gear to the third gear using a single down-shift circuit in the above-mentioned embodiment, it is possible to shift the automatic transmission in respective steps by providing the comparing circuit 52 and the down-shift circuit 53 plurally. For example, when two pairs of the comparing circuit 52 and the down-shift circuit 53 are provided in parallel, it is possible to shift the automatic transmission down from the top gear to the third gear using the first down-shift circuit and possible to shift it down from the third gear to the second gear using the second down-shift circuit.

Furthermore, in the above-mentioned embodiment, although the expectation value computing circuit 50 is so structured as to calculate the expectation value of the vehicle speed change, the expectation value computing circuit 50 (first computing means) may be also structured so as to calculate expectation value of the vehicle speed itself. In this case, the vehicle speed change computing circuit 51 (second computing means) is unnecessary, and the comparing circuit 52 (second comparing means) compares the vehicle speed signal output from the vehicle speed signal generating means with the signal output from the computing circuit 50.

In addition, concerning the F/V conversion circuit 14, it may be replaced with a device for converting the pulse signal supplied from the reed switch 10 into a digital data signal. In this case, a digital comparison circuit should be used as the comparing circuit 20 in order to compare the data in digital form.

In the constant-speed cruising control apparatus 1, the expectation value of the vehicle speed change is calculated by estimating the vehicle speed change on basis of the output signal to be supplied to the actuator 28 from the comparing circuit 20, and compared with the actual change of the vehicle speed. Accordingly, it is possible to detect when the vehicle starts travelling on the uphill road immediately, and possible to shift speedily the automatic transmission into the lower gear.

As mentioned above, according to this invention an excellent effect can be obtained since it is possible to prevent the slowing down of the vehicle speed and maintain the vehicle in the state of smooth constant-speed cruising even when the vehicle travels on the uphill road.

What is claimed is:

1. A constant-speed cruising control apparatus for a vehicle mounted with an automatic transmission, comprising:

vehicle speed signal generating means for outputting a vehicle speed signal corresponding to a travelling speed of said vehicle;

cruising speed setting means for setting said vehicle speed for constant-speed cruising as a cruising speed;

cruising speed signal memory means connected to said vehicle speed signal generating means and said cruising speed setting means for storing said vehicle speed signal output from said vehicle speed signal generating means as a cruising speed signal when said cruising speed setting means is set and for outputting the cruising speed signal;

first comparing means connected to said vehicle speed signal generating means and said cruising speed signal memory means for comparing the cruising speed signal output from said cruising speed signal memory means with said vehicle speed signal output from said vehicle speed signal generating means and for outputting a comparing signal in response to a result of the comparison;

throttle control means for controlling a throttle valve in the opening or closing direction according to the comparing signal output from said first comparing means;

first computing means connected to said first comparing means for calculating an expectation value of vehicle speed change on the basis of the comparing signal output from the first comparing means and for generating an expectation signal;

second computing means connected to said vehicle speed signal generating means for calculating change of the vehicle speed signal output from said vehicle speed signal generating means and for generating a speed difference signal;

second comparing means connected to said first and second computing means for comparing the expectation signal output from said first computing means with the speed difference signal output from the second computing means and generating a down-shift signal in a case where value of the speed difference signal output from said second computing means is not equal to the value of the expectation signal output from said first computing means; and down-shift means for shifting the automatic transmission into lower gear when the down-shift signal is output from said second comparing means.

2. A constant-speed cruising control apparatus for a vehicle set forth in claim 1, wherein said second comparing means further generates the down-shift signal also in a case where the value of the speed difference signal output from the second computing means exceeds the value of the expectation signal output from the first computing means by a predetermined value.

3. A constant-speed cruising control apparatus for a vehicle mounted with an automatic transmission, comprising:

vehicle speed signal generating means for outputting a vehicle speed signal corresponding to a travelling speed of said vehicle;

cruising speed setting means for setting the vehicle speed for constant-speed cruising as a cruising speed;

cruising speed signal memory means connected to said vehicle speed signal generating means and said cruising speed setting means for storing the vehicle speed signal output from said vehicle speed signal generating means as a cruising speed signal when said cruising speed setting means is set and for outputting the cruising speed signal;

first comparing means connected to said vehicle speed signal generating means and said cruising speed signal memory means for comparing the cruising speed signal output from said cruising speed signal memory means with the vehicle speed signal output from said vehicle speed signal generating means and for outputting a comparing signal in response to a result of the comparison;

throttle control means for controlling a throttle valve in the opening or closing direction according to the comparing signal output from said first comparing means;

first computing means connected to said cruising speed signal memory means and said vehicle speed signal generating means for calculating an expectation value of vehicle speed change on the basis of the cruising speed signal output from said cruising speed signal memory means and the vehicle speed signal output from said vehicle speed signal generating means and for generating an expectation signal;

second computing means connected to said vehicle speed signal generating means for calculating change of the vehicle speed signal output from the vehicle speed signal generating means and for generating a speed difference signal;

second comparing means connected to said first and second computing means for comparing the expectation signal output from the first computing means with the speed difference signal output from the second computing means and generating a down-shift signal in a case where the value of the speed difference signal output from said second computing means does not equal to the value of the expectation signal output from said first computing means; and down-shift means for shifting the automatic transmission into lower gear when the down-shift signal is output from said second comparing means.

4. A constant-speed cruising control apparatus for a vehicle as set forth in claim 3, wherein said second comparing means further generates the down-shift signal also in a case where the value of the speed difference signal output from the second computing means exceeds the value of the expectation signal output from the first computing means by a predetermined value.

* * * * *